(12) United States Patent
Sasaki et al.

(10) Patent No.: US 7,965,602 B2
(45) Date of Patent: Jun. 21, 2011

(54) INFORMATION RECORDING APPARATUS AND INFORMATION RECORDING METHOD

(75) Inventors: Yoshio Sasaki, Saitama (JP); Masakazu Furukawa, Saitama (JP); Hisao Tanaka, Saitama (JP); Hiroyuki Uchino, Saitama (JP)

(73) Assignee: Pioneer Corporation, Tokyo (JP)

( * ) Notice: Subject to any disclaimer, the term of this patent is extended or adjusted under 35 U.S.C. 154(b) by 534 days.

(21) Appl. No.: 12/100,463

(22) Filed: Apr. 10, 2008

(65) Prior Publication Data
US 2009/0022027 A1 Jan. 22, 2009

Related U.S. Application Data

(62) Division of application No. 10/231,130, filed on Aug. 30, 2002, now abandoned.

(30) Foreign Application Priority Data

Sep. 3, 2001 (JP) .................................. 2001-266460

(51) Int. Cl.
*G11B 7/00* (2006.01)

(52) U.S. Cl. ..................... 369/59.11; 369/47.1; 369/53.1

(58) Field of Classification Search .................... None
See application file for complete search history.

(56) References Cited

U.S. PATENT DOCUMENTS

| | | | |
|---|---|---|---|
| 5,561,642 A | 10/1996 | Saito et al. | |
| 5,592,322 A | 1/1997 | Kim | |
| 5,732,061 A | 3/1998 | Kirino et al. | |
| 5,737,301 A | 4/1998 | Miyamoto et al. | |
| 5,887,010 A | 3/1999 | Arai | |
| 5,917,793 A | 6/1999 | Uchiumi | |
| 6,426,929 B1 | 7/2002 | Watabe et al. | |

FOREIGN PATENT DOCUMENTS

| | | |
|---|---|---|
| EP | 0 317 193 A2 | 5/1989 |
| EP | 0 991 058 A1 | 4/2000 |
| JP | 6-150319 | 5/1994 |
| JP | 6-295440 | 10/1994 |
| JP | 9-044848 | 2/1997 |
| JP | 2000-298832 | 10/2000 |
| WO | 98/28735 | 7/1998 |

*Primary Examiner* — Van N Chow

(74) *Attorney, Agent, or Firm* — Drinker Biddle & Reath LLP

(57) ABSTRACT

In the information recording apparatus, by driving the light source by the pulse signal corresponding to the recording signal, the laser pulse corresponding to the recording signal is irradiated onto the recording medium. The recording signal has the mark period to form the recording mark, and the space period in which the recording mark is not formed. In the mark period, the output level of the laser pulse changes between the normal level and the writing level, thereby, the recording mark is formed on the recording medium. On the one hand, over a predetermined period in the space period, the output level of the laser pulse is changed to the low level lower than the normal level. Thereby, the heat accumulation onto the recording medium, due to the transient response of the laser pulse in the mark period, is reduced, and in the mark period after that, the correct recording mark can be formed.

8 Claims, 7 Drawing Sheets

INFORMATION RECORDING APPARATUS AND INFORMATION RECORDING METHOD

CROSS-REFERENCE TO RELATED APPLICATION

This is a divisional of U.S. application Ser. No. 10/231,130, filed Aug. 30, 2002, which is incorporated herein by reference in its entirety.

BACKGROUND OF THE INVENTION

The present disclosure relates to the subject matter contained in Japanese Patent Application No. 2001-266460 filed on Sep. 3, 2001, which is incorporated herein by reference in its entirety.

The present invention belongs to a technology to record the information onto the optical disk by using the laser light beam.

The laser light is irradiated onto the recording surface of the disk and the information is recorded in the writable or re-writable optical disk such as DVD-R (DVD-Recordable) or DVD-RW (DVD-Re-recordable). At a portion onto which the laser light is irradiated, on the recording surface of the optical disk, because the temperature rises, a change is generated in the optical recording medium constituting the optical disk, thereby, a recording mark is formed on the recording surface.

Accordingly, by the recording pulse having the time width corresponding to the information to be recorded, the laser light is modulated, and the laser pulse having the length corresponding to the signal to be recorded is generated, and by irradiating this onto the optical disk, the recording mark having the length corresponding to the information to be recorded, can be formed on the optical disk.

On the one hand, recently, one recording mark is not formed by the one laser pulse, and a method by which the recording mark is formed by the pulse train including a plurality of short pulses, is used. Such a method is also called write strategy, and as compared to a method by which a single recording pulse is irradiated, because the heat accumulation on the recording surface of the optical disk is reduced, the temperature distribution on the recording surface on which the recording mark is formed can be uniformed. As the result, it is prevented that the recording mark becomes the tear drop shape, and the preferably shaped recording mark can be formed.

The above recording pulse train is structured by a plurality of pulses whose amplitude is varied between a predetermined read power level and write power level. That is, according to the recording signal, in the area on the recording surface of the optical disk (hereinafter, called also "space portion") in which the recording mark is not formed, the laser light is irradiated onto the recording surface by the read power, and in the area on the recording surface of the optical disk (hereinafter, called also "mark portion") in which the recording mark is to be formed, the laser light is irradiated onto the recording surface by the power corresponding to the recording pulse train whose amplitude is varied between the read power and the write power, thereby, the recording mark is formed on the recording surface.

However, when the laser pulse corresponding to the recording pulse is irradiated onto the recording surface of the optical disk, by the transient response of the pulse, the laser irradiation level (bias level) after the irradiation of the recording pulse is increased. The recording pulse whose amplitude is varied between the read power and write power, and after the completion of the recording pulse, theoretically, the laser irradiation level instantaneously returns to the read power. However, practically, at the time of completion of the recording pulse, because the laser irradiation level instantaneously changes from the write power to the read power, the transient response of the recording pulse is generated, and the laser irradiation level does not instantaneously return to the read power, but rather than it, the laser irradiation level is increased for a constant period. As the result, also after the recording pulse is completed, although it is a short time, a period in which the laser irradiation level is higher than the read power level, is generated. There is a case where this influences the formation of the next recording mark as the heat interference. Particularly, when the space period to the next recording mark is short, because there is the residual heat by the above transient response at the time of formation of the next recording mark, there is a case where the next recording mark can not be correctly formed.

Then, this influence is specifically prominent when the recording speed is increased, that is, when the high speed recording is conducted onto the optical disk. In the case of the recording of the normal speed (low speed), because a time period to the mark period corresponding to the next recording mark can be secured to some extent, the influence of the above transient response is softened, however, when the recording speed is increased to 2 times or 3 times of the normal one, because the time interval of the recording pulse train becomes short, the next recording pulse train comes under the condition that the residual heat is remained, and the possibility that the residual heat due to the above transient response influences the next recording mark as the heat interference is increased.

Further, when the recording speed is increased, in order to form the recording mark correctly, it is necessary that the recording power is increased corresponding to the increased amount of the recording speed. Accordingly, the increase of the laser irradiation level becomes large, and the bad influence is increased.

Then, because the increase of the laser irradiation level due to the transient response of the recording pulse is generated after the application of the recording pulse as described above, that is, in the space period of the recording signal, this influence can not be removed by the write strategy technology by which the pulse width of the recording pulse is adjusted, and the recording mark shape is adjusted.

SUMMARY OF THE INVENTION

In view of the above problems, the present invention is attained, and the object of the present invention is to provide an information recording apparatus and the method by which, even at the time of the high speed recording, the influence of the transient response of the recording pulse train is eliminated and the correct recording mark can be formed.

In one point of view of the present invention, in an information recording apparatus in which the laser light is irradiated onto the recording medium and a recording mark corresponding to a recording signal is formed, it is provided with: a light source to emit the laser light; and a controller which controls to irradiate a laser pulse onto the recording medium when the light source is driven according to the recording signal, and the controller is provided with: a mark controller by which, during a mark period of the recording signal, the output level of the laser pulse is changed corresponding to the recording signal between a normal level and a higher writing level than the normal level; and a space controller by which, during at least several space periods in the recording signal, the output level of the laser pulse is changed to the low level lower than the normal level covering over a predetermined period.

According to the above information recording apparatus, when the light source is driven corresponding to the recording signal, the laser pulse corresponding to the recording signal is irradiated onto the recording medium. The recording signal has the mark period to form the recording mark and the space period in which the recording mark is not formed. In the mark period, the output level of the laser pulse changes between the normal level and the writing level, thereby, the recording mark is formed on the recording medium. On the one hand, over a predetermined period in the space periods, the output level of the laser pulse is changed to the low level lower than the normal level. Thereby, the heat accumulation onto the recording medium due to the transient response of the laser pulse in the mark period is reduced, and in the mark period after that, the correct recording mark can be formed.

In one mode of the above information recording apparatus, the low level lower than the normal level is a zero level.

According to this mode, in the space period, because the level of the laser pulse temporarily becomes zero, the accumulation of the heat to the recording medium is sufficiently reduced during that period.

In another mode of the above information recording apparatus, the space controller changes the output level of the laser pulse to the low level lower than the normal level only in the space period in which the time width is short.

According to this mode, the output level of the laser pulse is reduced only in the space period in which the time width is short. When the time width of the space period is short, while the heat on the recording medium by the laser pulse irradiated in the mark period preceding to that, is not sufficiently reduced, the next mark period comes and the probability in which the bad influence such as the heat interference is given to the next recording mark formation, is large. Accordingly, even when the output level of the laser pulse is reduced only in the space period in which the time width is short, good effect can be obtained.

In yet another mode of the above information recording apparatus, the space period in which the time width is short can be the space period of 3 T or 4 T.

In yet another mode of the above information recording apparatus, the space controller changes the output level of the laser pulse to the low level lower than the normal level in all space periods.

According to this mode, in all space periods, because the output level of the laser pulse is reduced, the influence of the heat interference due to the transient response of the laser pulse in the mark period can be effectively eliminated.

In further yet another mode of the above information recording apparatus, in the space period in which the time width is long, the space controller changes the output level of the laser pulse to the low level over the predetermined first period, and in the space period in which the time width is short, the output level of the laser pulse is changed to low level over the second period which is longer than the first period.

According to this mode, in the short space period, because the transient response of the laser pulse during the preceding mark period easily influences the next mark period, the output level of the laser pulse is lowered over the longer period.

In further yet another mode of the above information recording apparatus, the space period in which the time width is short is a space period of 3 T or 4 T, and the space period in which the time width is long can be a space period of 5 T or more.

In further yet another mode of the above information recording apparatus, it is further provided with a level adjuster which automatically adjusts the output level of the laser pulse over the level adjustment period in the predetermined space period, and the space controller changes the output level of the laser pulse to the low level lower than the normal level only in the space period in which the output level is not automatically adjusted.

According to this mode, the output level of the laser pulse is lowered only in the space period in which the output level of the laser pulse is not automatically adjusted.

In further yet another mode of the above information recording apparatus, it is further provided with a level adjuster which automatically adjusts the output level of the laser pulse over the level adjustment period in the predetermined space period, and the space controller changes the output level of the laser pulse to the low level lower than the normal level in all space periods, in the period other than level adjustment period.

According to this mode, within the range which does not influence the automatic adjustment of the output level of the laser pulse, the output level of the laser pulse can be lowered.

In further yet another mode of the above information recording apparatus, it is further provided with a level adjuster which automatically adjusts the output level of the laser pulse over the level adjustment period in the predetermined space period, and the space controller changes the output level of the laser pulse to the low level over the predetermined first period which does not overlap with the level adjustment period, in the space period in which the automatic adjustment of the output level is conducted, and in the space period in which the automatic adjustment of the output level is not conducted, over the second period longer than the first period, the output level of the laser pulse is changed to the low level.

According to this mode, in the space period in which the automatic adjustment of the laser pulse is not conducted, the output level of the laser pulse is lowered over a long period, and in the space period in which the automatic adjustment of the laser pulse is conducted, the output level of the laser pulse is lowered in the range which does not influence the automatic adjustment.

In further yet another mode of the above information recording apparatus, the recording medium is a recording medium in which the recording can be conducted only once, and the normal level can be a reading level.

According to this mode, the present invention can be applied to the recording medium such as CD-R or DVD-R.

In further yet another mode of the above information recording apparatus, the recording medium is a recording medium in which the wiring and erasing can be conducted over a plurality of times, and the normal level can be an erasing level.

According to this mode, the present invention can be applied to the recording medium such as CD-RW or DVD-RW.

In further yet another mode of the above information recording apparatus, the space controller changes the output level of the laser pulse to the low level lower than the normal level from the top of the space periods.

According to this mode, because the output level of the laser pulse is lowered from the top of the space periods, after the completion of the mark period in which the laser pulse of the writing level is irradiated, the laser power is lowered at once, and the influence of the transient response can be effectively rejected.

In the another point of view of the present invention, in the information recording method in which the laser light is irradiated onto the recording medium and the recording mark corresponding to the recording signal is formed, it has a step to emit the laser light and a step by which, by driving the light source according to the recording signal, the laser pulse is irradiated onto the recording medium, and the step to emit the laser pulse has a step by which, during the mark period of the recording signal, the output level of the laser pulse is changed, corresponding to the recording signal, between the normal level and the writing level higher than the normal level, and a step by which, during at least several space periods of the recording signal, covering over the predetermined period, the output level of the laser pulse is changed to the low level lower than the normal level.

According to the information recording method, by driving the light source by the pulse signal corresponding to the recording signal, the laser pulse corresponding to the recording signal is irradiated onto the recording medium. The recording signal has the mark period to form the recording mark, and the space period in which the formation of the recording mark is not conducted. In the mark period, the output level of the laser pulse changes between the normal level and the writing level, thereby, the recording mark is formed on the recording medium. On the other hand, over the predetermined period in the space period, the output level of the laser pulse is changed to the low level lower than the normal level. Thereby, the heat accumulation onto the recording medium due to the transient response of the laser pulse in the mark period, is reduced, and in the mark period after that, the correct recording mark can be formed.

DETAILED DESCRIPTION OF THE PREFERRED EMBODIMENTS

Figure 1:
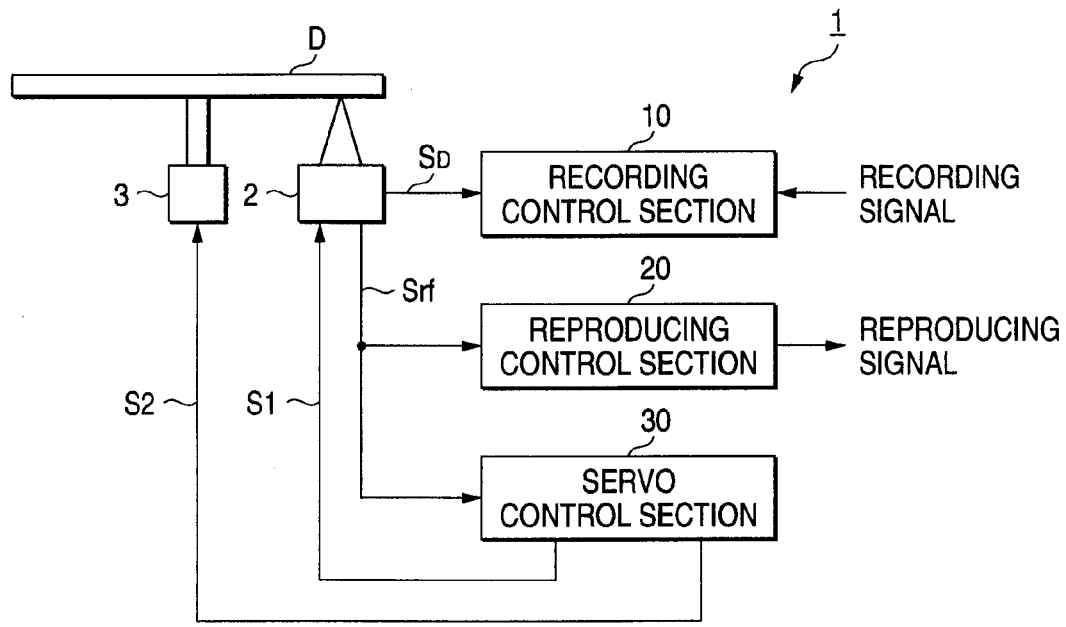
FIG. 1 is a block diagram showing the outline structure of an information recording reproducing apparatus to which the present invention is applied.

Referring to the drawings, the preferred embodiment of the present invention will be described below.

(1) Apparatus Structure

In FIG. 1, the overall structure of an information recording reproducing apparatus according to the embodiment of the present invention is generally shown. The information recording reproducing apparatus 1 records the information in an optical disk D, and reproduces the information from the optical disk D. As the optical disk D, various optical disks such as, for example, CD-R (Compact Disc-Recordable), DVD-R in which the recording can be conducted only once, or CD-RW (Compact Disc-Rewritable), DVD-RW in which, over a plurality of times, the erasing and recording can be conducted, can be used.

The information recording reproducing apparatus 1 is provided with: an optical pick-up 2 by which the recording beam and reproducing beam are irradiated onto the optical disk D; a spindle motor 3 by which the rotation of the optical disk D is controlled; a recording control section 10 by which the recording of the information onto the optical D disk is controlled; a reproducing control section 20 by which the reproduction of the information which is already recorded in the optical disk is controlled; and a servo control section 30 by which each kind of servo control including a spindle servo to control the rotation of the spindle motor 3, and a focus servo which is a relative position control of the optical pick-up 2 to the optical disk D, and a tracking servo, is conducted.

The recording control section 10 receives the recording signal, and generates a drive signal $S_D$ to drive the laser diode inside the optical pick-up 2 by the processing which will be described later, and supplies it to the optical pick-up 2.

The reproducing control section 20 receives the reading RF signal Srf outputted from the optical pick-up 2, and a predetermined demodulation processing and decoding processing are conducted on that, and the reproduction signal is generated and outputted.

The servo control section 30 receives the reading RF signal Srf from the optical pick-up 2, and according to that, a servo signal S1 such as the tracking error signal, and focus signal is supplied to the optical pick-up 2, and the spindle servo signal S2 is supplied to the spindle motor 3. Thereby, each kind of servo processing such as the tracking servo, focus servo, or spindle servo, is conducted.

In this connection, the present invention mainly relates to the recording method in the recording control section 10, and for the reproducing control and servo control, because the already known various methods can be applied, for these methods, the detailed description is not conducted.

Further, in FIG. 1, the information recording reproducing apparatus as one embodiment of the present invention is shown, however, the present invention can also be applied to the recording-only information recording apparatus.

Figure 2:
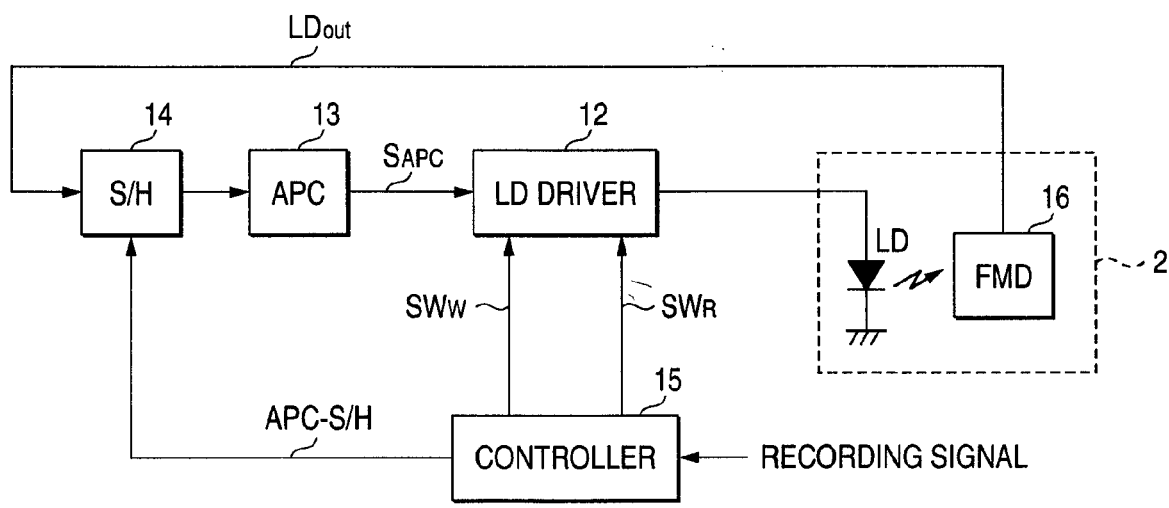
FIG. 2 is a block diagram showing the structure of a recording control section shown in FIG. 1.

In FIG. 2, the internal structure of the optical pick-up and the recording control section 10 are shown. As shown in FIG. 2, the optical pick-up 2 is provided with: a laser diode LD which generates the recording beam to record the information to the optical disk D and the reproducing beam to reproduce the information from the optical disk D; and a front monitor diode (FMD) 16 which receives the laser light emitted from the laser diode LD and outputs the laser power level signal LDout corresponding to the laser light.

In this connection, the optical pick-up 2 is provided with, other than that, already known components such as an optical detector to receive the reflection beam by the optical disk D of the reproducing beam and generate the reading RF signal Srf, and the optical system to guide the recording beam and reproduction beam, and reflection beam to an adequate direction, however, those illustrations and detailed description will be omitted.

On the one hand, the recording control section 10 is provided with a laser diode (LD) driver 12, APC (Automatic Power Control) circuit 13, sample hold (S/H) circuit 14, and controller 15.

The LD driver 12 supplies the current corresponding to the recording signal to the laser diode LD, and conducts the recording of the information onto the optical disk D. The front monitor diode 16 is arranged in the vicinity of the laser diode LD in the optical pick-up 2, receives the laser light emitted from the laser diode LD, and outputs the laser power level signal LDout showing the level.

The sample hold circuit 14 samples the level of the laser power level signal LD out at the timing regulated by the sample hold signal APC-S/H, and holds it. The APC circuit 13 power-controls the LD driver 12 so that the read power level of the laser light emitted from the laser diode LD becomes constant, according to the output signal of the sample hold circuit 14.

The controller 15 mainly conducts the recording operation and APC operation. Initially, the recording operation will be described. In the recording operation, the controller 15 generates the switching signal $SW_R$ and $SW_W$ of the switch to control the current amount supplied to the laser diode LD, and supplies it to the LD driver 12.

Figure 3:
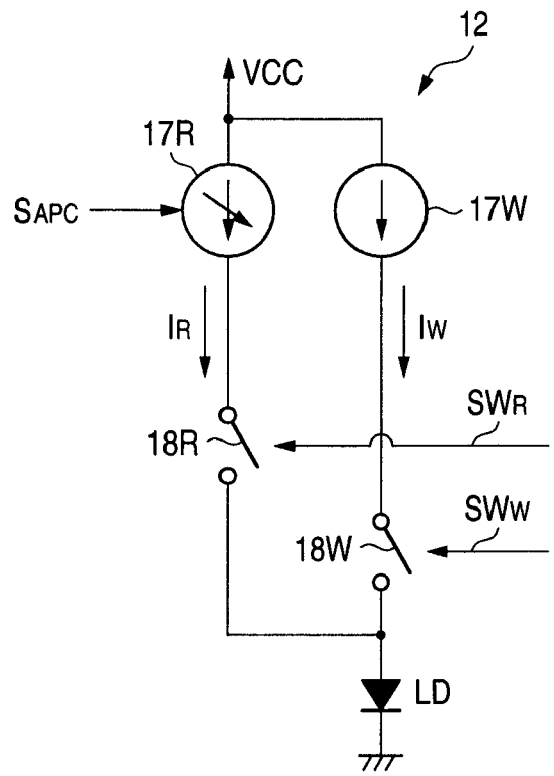
FIG. 3 is a view showing the structure of an LD driver shown in FIG. 2.

In FIG. 3, the detailed structure of the LD driver 12 is shown. As shown in FIG. 3, the LD driver 12 is provided with the current source 17R for the read level, the current source 17W for the write level, and switches 18R and 18w.

The current source 17R for the read level is the current source which flows the drive current $I_R$ to make the laser diode LD emit the laser light by the read power, and the drive current $I_R$ is supplied to the laser diode LD through the switch 18R. Accordingly, when the switch 18R is turned on, the drive current $I_R$ of the read power is supplied to the laser diode LD, and when the switch 18R is turned off, the supply of the drive current $I_R$ is stopped. The magnitude of the current from the current source 17R is changed by the control signal $S_{APC}$.

The current source 17W for the write level is the current source which flows the drive current $I_W$ to make the laser diode LD emit the laser light by the write power, and the drive current $I_W$ is supplied to the laser diode LD through the switch 18W. Accordingly, when the switch 18W is turned on, the drive current $I_W$ of the write power is supplied to the laser diode LD, and when the switch 18W is turned off, the supply of the drive current $I_W$ is stopped.

Figure 4:
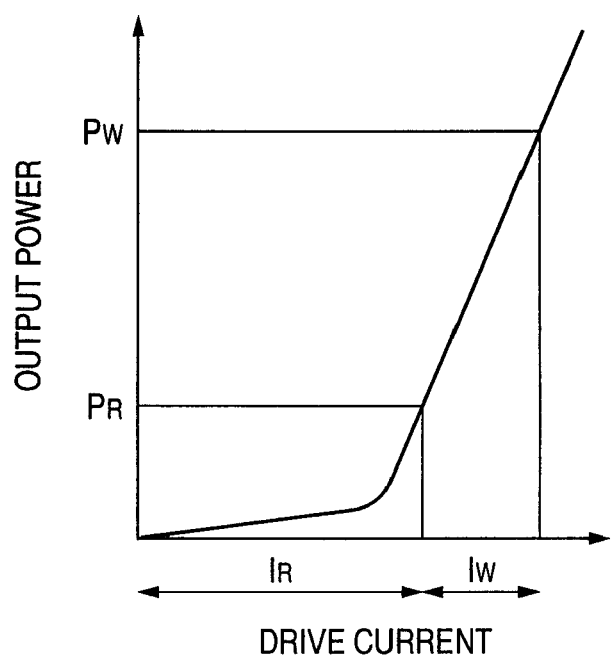
FIG. 4 is a graph showing the relationship between the drive current given to a laser diode and the output power.

In FIG. 4, the relationship between the drive current supplied to the laser diode LD, and the output power of the laser light which is emitted from the laser diode LD, is shown. As can be seen from FIG. 4, when the drive current $I_R$ is supplied to the laser diode LD, the laser light is emitted by the read power $P_R$. Under that condition, when the drive current $I_W$ is further added, the laser light is emitted by the write power $P_W$.

At the time of recording of the information onto the optical disk, basically, the drive current $I_R$ is always supplied, and the laser light is emitted by the read power $P_R$, and further, according to the recording pulse, by adding the drive current $I_W$, the write power $P_W$ is applied, and the information is recorded onto the optical disk. However, in the present invention, as detailed below, it is characterized that: after the last pulse of the recording pulse train of the write power is applied, both of the switches 18R and 18W are temporarily simultaneously turned off, and the drive current is made zero, thereby, the influence of the transient response is removed.

Next, the APC operation will be described. The APC operation is an operation by which the drive current level supplied from the LD driver 12 to the laser diode LD is adjusted so that the level of the read power of the laser light outputted from the laser diode LD becomes constant. In more detail, in the space portion of the recording signal (which is 8-16 modulated, and has the mark periods and space periods of the length of 3 T-11 T, 14 T), in the long space period (for example, the space period of 5 T-11 T, 14 T), the drive signal $S_D$ from the LD driver 12 is adjusted so that the level of the read power becomes constant.

Specifically, it operates as follows. The controller 15 generates the recording pulse corresponding to the recording signal as described above, and by the recording pulse, the LD driver 12 is driven and the laser light is emitted from the laser diode LD.

The front monitor diode 16 is arranged in the vicinity of the laser diode LD in the optical pick-up 2, receives the laser light emitted from the laser diode LD, and the laser power level signal LDout showing the level is generated, and supplied to the sample hold circuit 14.

The sample hold circuit 14 samples the laser power level signal LDout supplied from the front monitor diode 16, at the timing given by the sample hold signal APC-S/H inputted from the controller 15, and holds its level for a predetermined period. The sample hold signal APC-S/H outputted from the controller 15 is a pulse showing the period in which the APC is conducted, and specifically, a pulse signal showing a predetermined period (the period in which the APC is conducted, and hereinafter, called also "APC period") in the comparatively long space period in the recording signal (5 T-11 T).

Accordingly, the sample hold circuit 14 holds the level of the laser power level signal LDout in the APC period in the space period of the recording signal and supplies it to the APC circuit 13. The APC circuit 13 supplies the control signal SAPC to the LD driver 12 so that the level of the laser power level signal LDout becomes constant in the APC period.

The control signal $S_{APC}$ is inputted into the current source 17R for the read level in the LD driver 12 as shown in FIG. 3. Thereby, corresponding to the control signal $S_{APC}$, the current $I_R$ flowing from the current source 17R for the read level is changed. That is, the APC is conducted so that the read power level obtained from the laser diode LD becomes constant.

(2) First Embodiment

Figure 5:
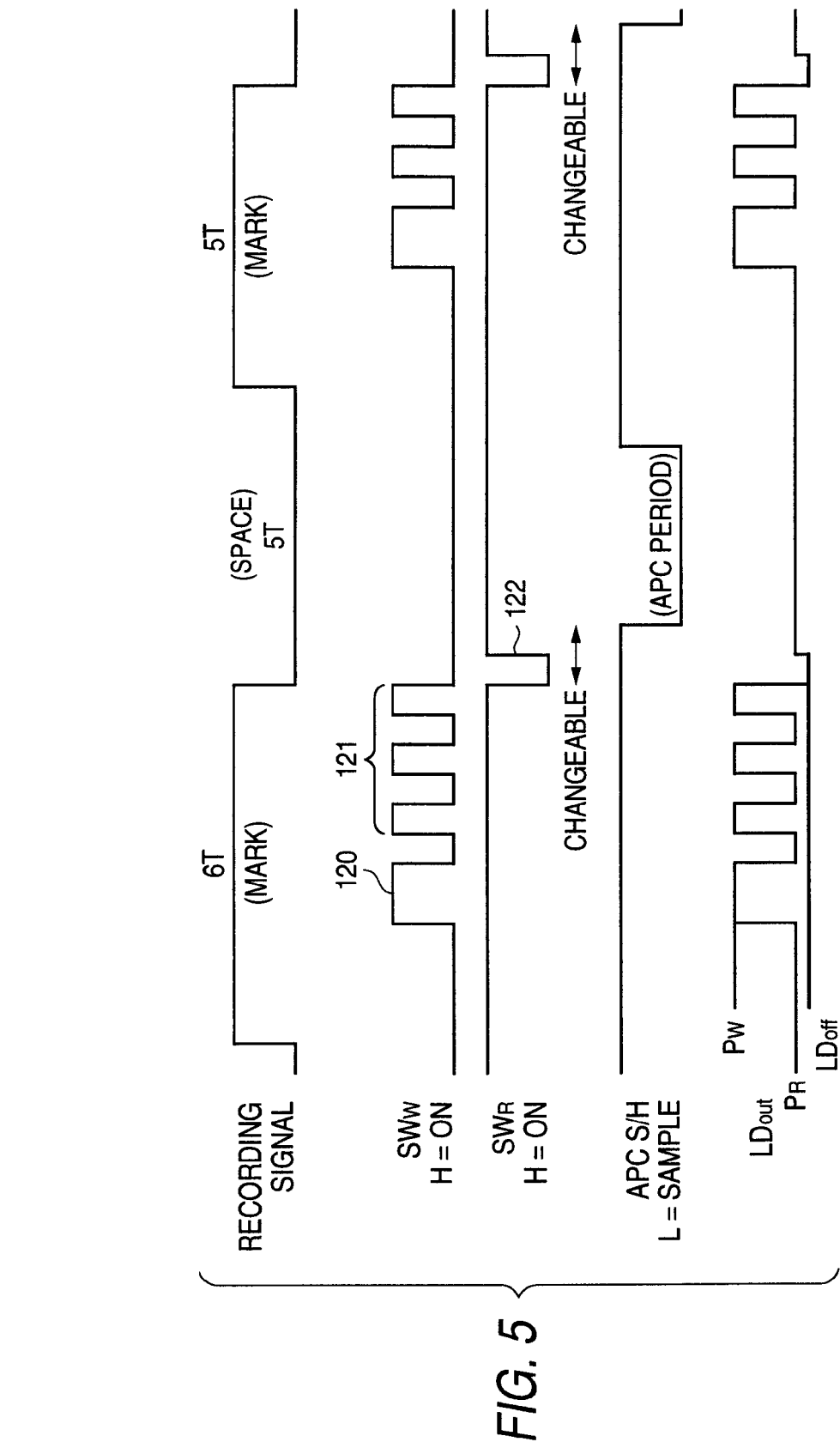
FIG. 5 is a timing chart showing a waveform of each portion of a recording control section at the time of the recording control according to the first embodiment of the present invention.

Next, referring to FIG. 5, the first embodiment of the recording control by the recording control section 10 will be described. FIG. 5 is a timing chart showing the waveform of each portion of the recording control section 10. In this connection, the first embodiment is an example in which the recording control of the present invention is applied to the recording of DVD-R.

In FIG. 5, the recording signal is a 8-16 modulation signal, and corresponds to the mark to be formed on the recording surface of the optical disk, and has the mark period and space period. On the recording surface of the optical disk, because a pit having any length of 3 T-11 T, 14 T, is formed, in the recording signal, the mark period and space period of 3 T-11 T, 14 T, are included. In the example of FIG. 5, in the recording signal, the mark period of the length 6 T, space period of 5 T, and mark period of 5 T are shown.

The switching signal $SW_R$ is a signal to switch the switch 18R connected to the current source 17R for the read power shown in FIG. 3, and as a principle, it is turned on in both of the mark period and space period. In the mark period, the switching signal $SW_W$ to switch the switch 18W connected to the current source 17W for the write power is switched according to the recording pulse train. The recording pulse train is switched corresponding to a top pulse 120 whose time width is long, and the multi-pulse following that (called also "pulse train") 121. Then, in a predetermined period (period of the pulse 122) from the timing at which the last pulse of the pulse train is completed, both of the switches 18R and 18W are turned off, and the current flowing the laser diode LD is made zero.

In several periods after the last pulse of the pulse train is completed, as described above, due to the transient response of the pulse, the period in which the laser power level is higher than the read power level is generated, however, as described above, in a predetermined period after the last pulse of the power train is completed, the read power is also turned off (hereinafter, the period is called "laser off period"), by making the current of the laser diode LD zero, the increase of the laser power level generated due to the transient response can be absorbed.

The waveform of the laser power level signal Lout shown in FIG. 5 shows this situation. That is, in the mark period of the first 6 T, initially, the read power $P_R$ is continuously applied, and the top pulse 120 having the amplitude of the write power $P_W$ and the pulse train 121 composed of 3 pulses are applied. Thereby, the recording mark whose length is 6 T is formed on the recording surface of the optical disk.

Then, in the space period following the mark period of 6 T, in the laser off period 122 after the completion of the last pulse of the pulse train 121, not only the write power but the read power is also turned off, as the result, the laser power level signal LDout is lowered to the zero level LDoff. Then, when the laser off period 122 is completed, the laser power level signal LDout is increased to the read power level $P_R$.

Also in the mark period of 5 T of the right side in FIG. 5, in the same manner, the laser off period 122 is provided (however, because of 5 T mark period, the pulse train 121 is composed of 2 pulses).

As described above, after the all mark periods are completed, that is, when a predetermined laser off period is provided just after the last recording pulse in the mark period, the influence of transient response after the mark period completion can be removed.

The time width of the laser off period can be made changeable, and for example, it can be set to the arbitrary length between 1 T-2 T. However, in the time width of the laser off period, there is a limitation in the relationship with the. APC. As described above, for example, in the longer space period than 5 T, the APC period is set, and the laser power level signal LDout is sample-held by the sample hold circuit 14, and because the APC is conducted so that the level is maintained, it is necessary that, in the APC period, the laser power level signal LDout is made to the read power level, and when the laser is turned off during the period, the hindrance occurs in the APC.

Accordingly, the laser off period 122 cannot overlap with the APC period (that is, the period in which the sample hold signal APC-S/H is in the low level). Normally, the APC period is set in such a manner that the period of before or after 1-2 T in the space period of 5 T-11 T is excepted as a margin, and it is set in the remained period. Accordingly, in the margin of 1-2 T in the top of the space period, even when the laser is turned off, the hindrance does not occur in the APC. Therefore, in the space period in which the APC is conducted, it is preferable that, in the laser off period, after the mark period is completed, it is set before the start of the APC period. Actually, as described above, it is preferable that, in the margin of 1 T-2 T provided in the top of the space period, the laser off period is set.

Figure 6A:
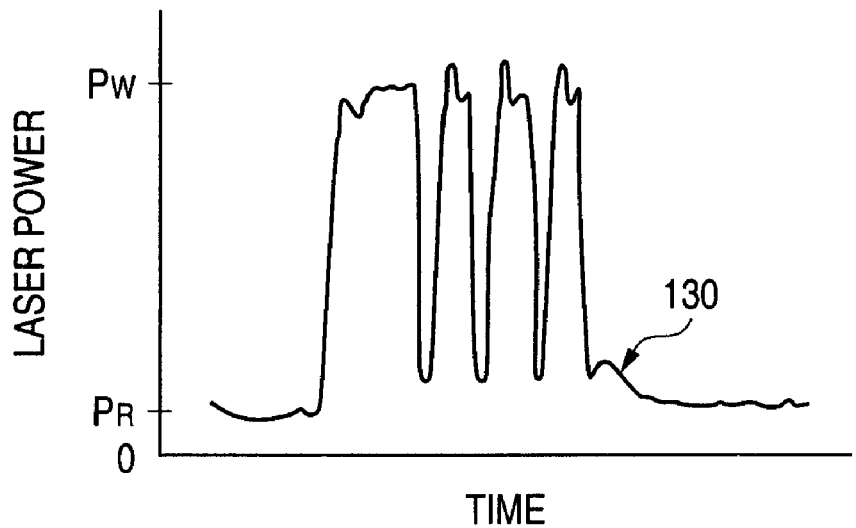
FIGS. 6A and 6B are waveform views showing a laser output level including a laser off period.
Figure 6B:
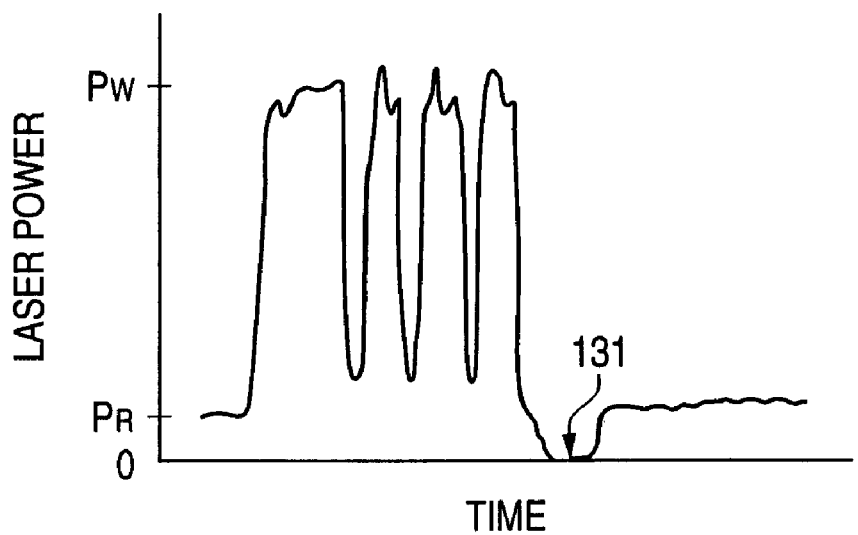

In FIG. 6, an actual example of waveform of the laser light is shown. FIG. 6A is a waveform of the laser power level signal LDout when the laser off period is not provided, which is prepared for the comparison, and FIG. 6B is the waveform of the laser power level signal LDout of the method (laser off period is provided) of the present application. As shown in FIG. 6A, when the laser off period is not provided, the transient response is generated after the last pulse of the pulse train, and the laser power level is increased (refer to a portion of code 130). In contrast to that, as shown in FIG. 6B, when the laser off period is provided, the laser power level signal Ldout, temporarily drops to the zero level after the last pulse of the pulse train (refer to a portion of code 131). Accordingly, the residual heat on the recording surface of the optical disk is small, and the bad influence due to the heat interference can be prevented from being exerted onto the mark formation in the succeeding mark period.

Figure 7A:
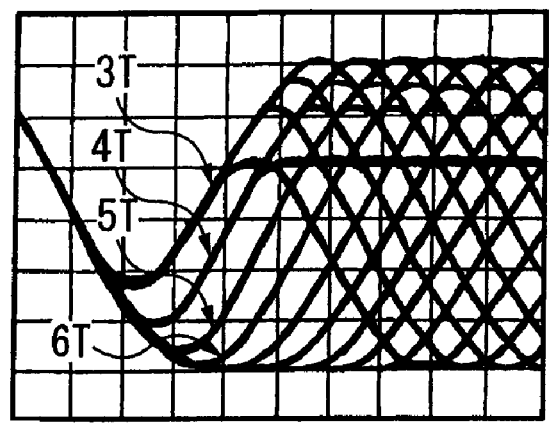
FIGS. 7A to 7C are waveform views of a reading RF signal of a recording mark.

FIG. 7 shows, when the laser off period is provided, and not provided, the reading RF signal waveform of the recording mark empirically formed on the optical disk. FIG. 7A is a case where the laser off period is provided, and the envelope waveform of the reading RF signal of 3 T mark, 4 T mark, 5 T mark, and 6 T mark has a clear contour.

Figure 7B:
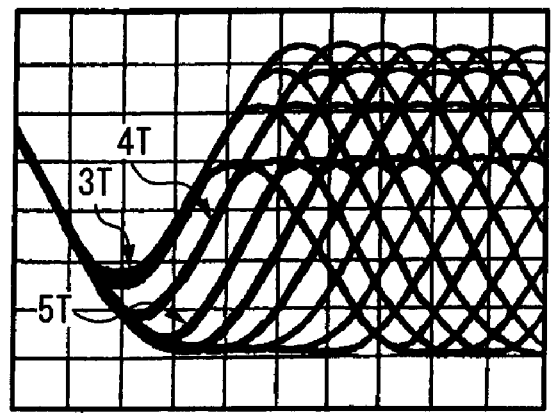
Figure 7C:
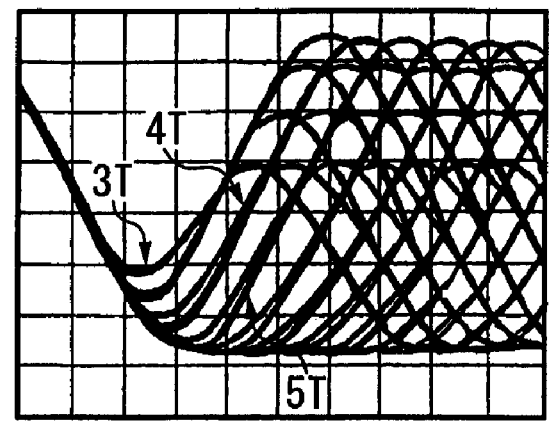

On the one hand, FIGS. 7B and 7C are envelope waveforms when the laser off period is not provided, and the heat interference due to the transient response of the pulse affects the succeeding mark formation. In the case of FIG. 7B, the contour of each envelope waveform is blurred and becomes bold, and in the case of FIG. 7C, further, it is seen as if each envelope wavelength is branched to two. Such the phenomenon is caused by that the recording mark is inadequately deformed due to the heat interference.

As described above, according to the present invention, when the laser off period is provided after the mark period, the influence of the heat interference due to the transient response of the recording pulse is excluded and the correct recording mark can be formed.

(3) Second Embodiment

Next, the second embodiment of the present invention will be described. In the above first embodiment, the laser off period is provided in the all space periods after the mark period, however, in the second embodiment, the laser off period is provided with only the short period (for example, the space period of 3 T or 4 T), and the laser off period is not provided with the long space period (for example, the space period more than 5 T). In this connection, the second embodiment is also an example in which the recording control of the present invention is applied to the recording of the DVD-R.

The laser off period is provided for the purpose to remove the influence caused by that the laser power level is increased due to the transient response after the completion of the recording pulse as described above, however, when the space period following the mark period is long, because there is the afford of time to the next mark period, the transient response is hardly comparatively affected on the next mark period. In contrast to this, when the space period following the mark period is short, because the time to the next mark period is short, the probability that the residual heat of the level increased amount due to the transient response exerts a bad influence on the recording mark formation in the next mark period, is increased.

From these reasons, even when the laser off period is provided in only the short space period, the bad influence given to the mark formation of the next mark period due to the transient response can be removed.

In this case, the laser off period can be set longer than in the case of the first embodiment. As described previously, in the long space period of 5 T-11 T, and 14 T, the APC period to sample-hold the laser power level signal LDout for the APC is set. Therefore, it is necessary that the laser off period is not overlapped with the APC period, and the time width of the laser off period is practically limited to the length of about 1 T-2 T.

In contrast to this, in the second embodiment, the laser off period is set only in the short space period (space period of 3 T or 4 T), and because the APC period is not set in the short space period, the laser off period can be set long.

Figure 8:
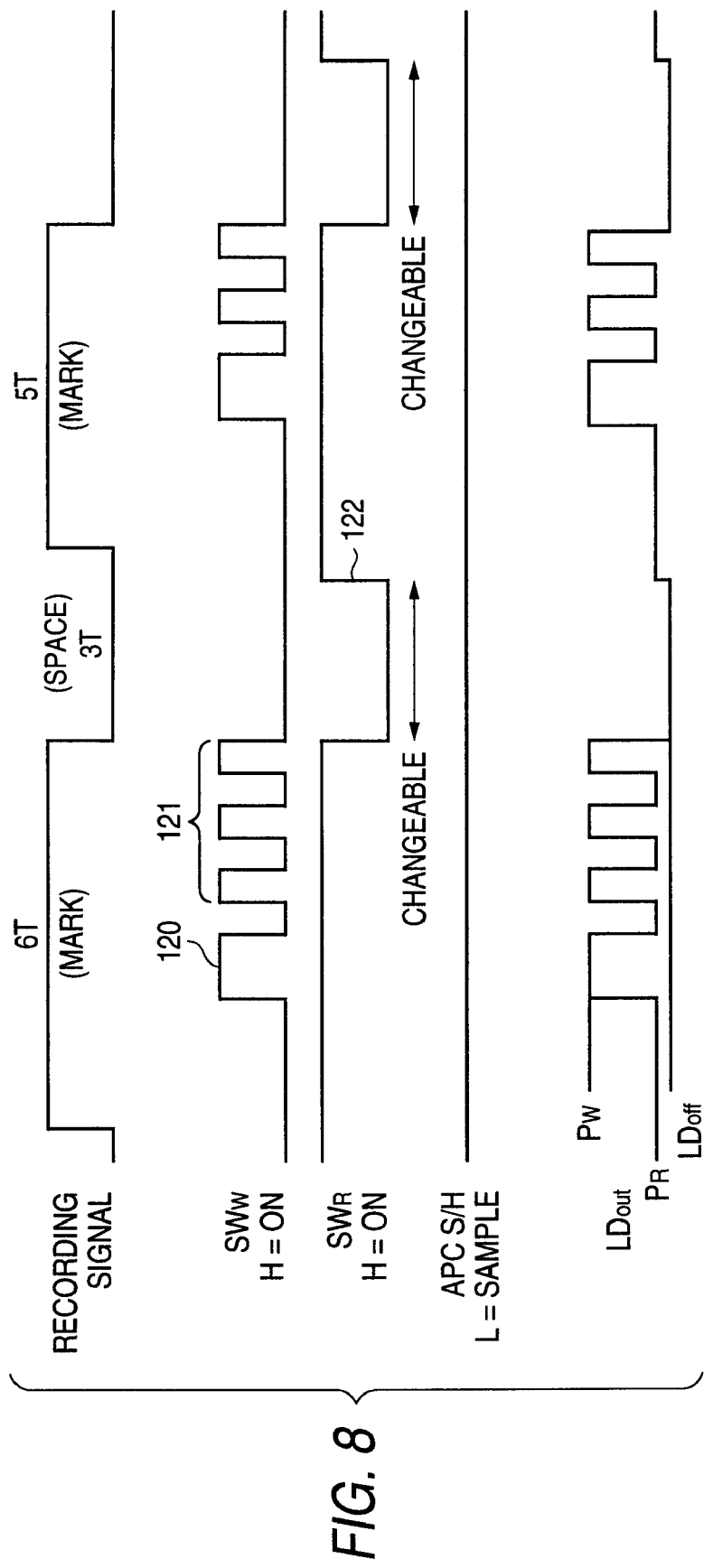
FIG. 8 is a timing chart showing the waveform of each portion of the recording control section at the time of the recording control according to the second embodiment of the present invention.

Referring to FIG. 8, this will be described. FIG. 8 shows the waveform of each portion of the recording control section 10 in the second embodiment, and the space period of 3 T exists after the mark period of 6 T, and further, the mark period of 5 T follows. In the space period of 3 T, because the APC period is not set, the sample hold signal APC-S/H remains in the high level, and the sample-hold of the laser power level signal LDout is not conducted. Accordingly, in the space period of 3 T after the completion of the mark period of 6 T, the laser off period 122 is set sufficiently long. Thereby, the residual heat on the information recording surface of the optical disk is reduced, and the influence of the transient response of the recording pulse can be effectively prevented from being exerted on the next mark period.

In this connection, in this meaning, it can also be said that the second embodiment is a method by which the laser off period is set only in the space period in which the APC is not conducted.

Further, the first embodiment and the second embodiment can be combined with each other. That is, as the first embodiment, the laser off period is provided in all mark periods, and as the second embodiment, in the short space period, the laser off period can be set long. Thereby, in the case of the short space, because the laser off period becomes long, the heat interference can be effectively prevented.

(4) Third Embodiment

Next, the third embodiment of the present invention will be described. The above first and second embodiments are examples in which the present invention is applied to the DVD-R, however, the third embodiment is an example in which the present invention is applied to the DVD-RW. In FIG. 10, the waveform view of each portion of the recording control section 10 in the recording onto the DVD-RW is shown. In the DVD-RW, the recording mark is formed by basically the same method as the DVD-R, however, because the erasing operation is conducted before the recording operation, as shown in the laser power level signal LDout in FIG. 10, normally, the laser power from the laser diode LD is on the erasing level $P_E$. Accordingly, the APC is also conducted when the erasing level $P_E$ is sample-held in the APC period set in the long space period.

In the same manner as in the case of the DVD-R, the recording pulse train is structured by the top pulse 120 and the pulse train 121. Then, after the completion of the pulse train 121, the laser off period 122 is provided, and the laser power level is temporarily dropped to the zero level LDoff. After that, the laser power level returns to the erasing level PE which is steady state.

As described above, also in the case of the DVD-RW, when the laser off period is provided after the completion of the recording pulse, the influence of the heat interference due to the transient response can be removed.

Figure 9:
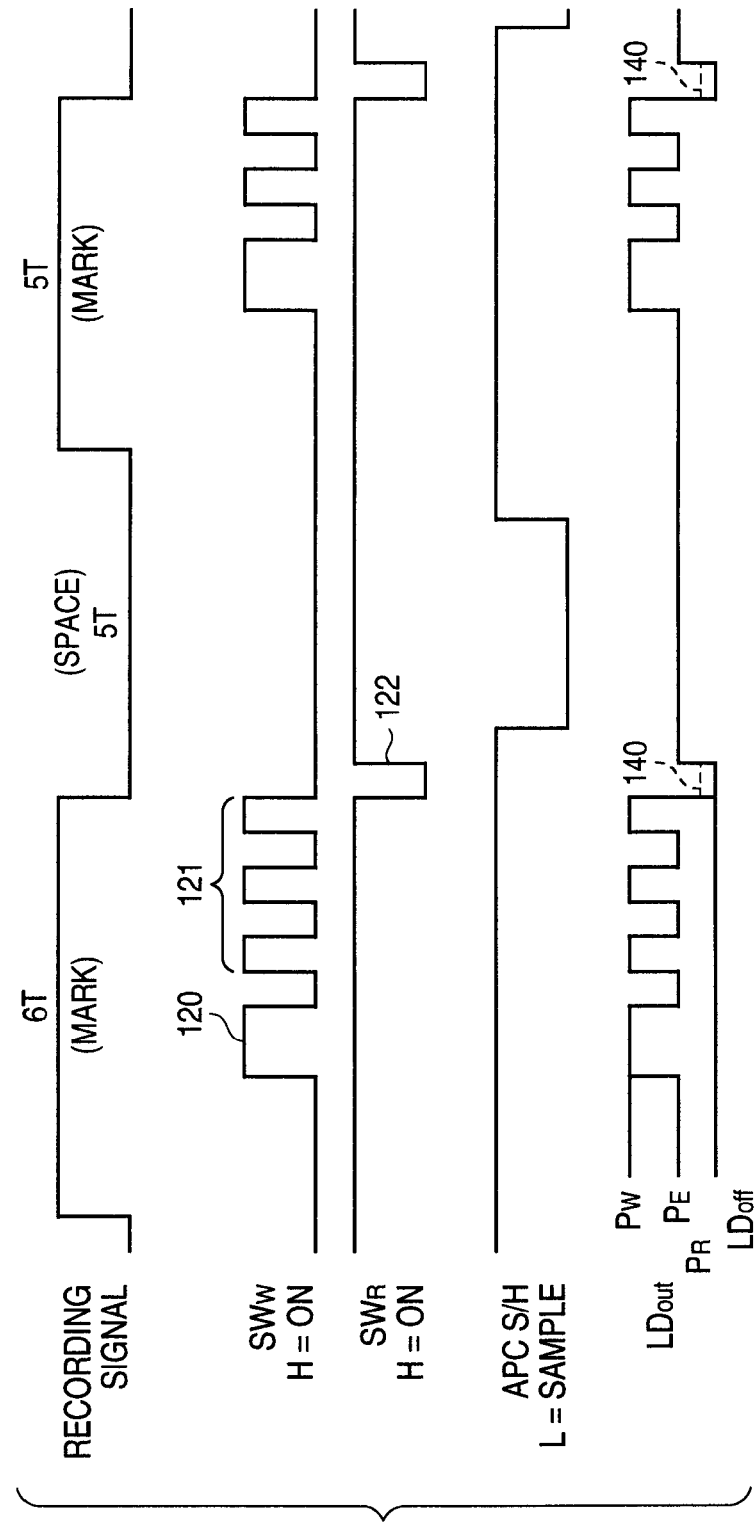
FIG. 9 is a timing chart showing the waveform of each portion of the recording control section at the time of recording control according to the third embodiment of the present invention.

In this connection, in the case of the DVD-RW, the time width of the laser off period is limited to the range by which the erasing operation is not affected. That is, in the laser off period, because the laser power level does not come to the erasing level, the erasing of the information already recorded on the DVD-RW can not be conducted. Accordingly, when the laser off period is made too long, already recorded information can not be erased, and there is a disadvantage that un-erased portion of the information is generated. Accordingly, the time width of the laser off period is limited to the comparatively short period in which it does not affect the erasing of the information. In the practice, in the case of the DVD-RW, after the completion of the recording pulse, the period in which the laser power is dropped to the read level (it is called "cool pulse period". Refer to the broken line 140 in FIG. 9) is provided. Accordingly, as one preferred method, when the laser off period is provided in the cool pulse period, the problem such as un-erased portion is not generated.

(5) Modified Example

In the above laser off period, the current value given to the laser diode LD is made zero so that the laser power level perfectly becomes zero. However, even when the laser power level is not perfectly made zero, when it is set to the low level lower than the read power level, because the residual heat onto the disk is reduced by the amount, the effect by which the influence of the heat interference is reduced, can be obtained.

Further, in the above embodiment, the laser off period is started after the last pulse in the mark period is completed, however, theoretically, when it is before the next mark period comes, in any portion in the space period, when the laser off period is provided, the heat interference with the next recording mark formation can be reduced. Particularly, in the space period in which the APC period is not set, because the laser off period with sufficient time width can be set, the laser off period may not always start from just after the mark period completion.

As described above, according to the present invention, in the space period after the completion of the mark period, because the laser off period in which the laser power is temporarily dropped to near the zero level is provided, the increase of the laser power level (bias level) due to the transient response of the recording pulse is softened, and the bad influence onto the next recording mark formation due to the heat interference can be prevented. This is effective in the point that the recording mark of the preferable shape can be formed particularly even in the case where the recording speed is heightened.

What is claimed is:

1. An information recording apparatus for irradiating a recording medium with a laser to form a recording mark according to a recording signal, the apparatus comprising:
   a light source which emits said laser; and
   a controller which projects a laser pulse onto said recording medium by driving said light source based on said recording signal,
   wherein said controller comprises a mark controller which changes an output level of said laser pulse between a normal level and a writing level that is higher than said normal level in accordance with said recording signal during a mark period of said recording signal, and
   a space controller which changes the output level of said laser pulse to a level lower than said normal level for a predetermined period during a space period of said recording signal that has one of several time widths, and
   wherein said space controller changes the output level of said laser pulse for a predetermined first period in a space period having a long time width among said several time widths, and changes the output level of said laser pulse for a second period that is longer than the first period in a space period having a short time width among said several time widths.

2. The apparatus according to claim 1, wherein said level lower than said normal level is a zero level.

3. The apparatus according to claim 1, wherein said space controller changes the output level of said laser pulse to said level lower than said normal level in all of space periods of said several time widths.

4. The apparatus according to claim 1, wherein said space period having a short time width is a space period of 3T or 4T and said space period having a long time width is a space period of 5T or more.

5. The apparatus according to claim 1, wherein said recording medium is a recording medium which allows recording only once, and said normal level is a reading level.

6. The apparatus according to claim 1, wherein said recording medium is a recording medium which allows recording and erasing several times, and said normal level is an erase level.

7. The apparatus according to claim 1, wherein said space controller changes the output level of said laser pulse to said level lower than said normal level from a start of said space period.

8. An information recording method for irradiating a recording medium with a laser to form a recording mark according to a recording signal, the method comprising:

a step of emitting said laser; and a control step of projecting a laser pulse onto said recording medium by controlling said laser based on said recording signal, wherein said control step comprises a step of changing an output level of said laser pulse between a normal level and a writing level that is higher than said normal level in accordance with said recording signal during a mark period of said recording signal, and a space control step of changing the output level of said laser pulse to a level lower than said normal level for a predetermined period during a space period of said recording signal that has one of several time widths, and wherein said space control step changes the output level of said laser pulse for a predetermined first period in a space period having a long time width among said several time widths, and changes the output level of said laser pulse for a second period that is longer than the first period in a space period having a short time width among said several time widths.

* * * * *